(12) United States Patent
Shan et al.

(10) Patent No.: US 12,430,770 B2
(45) Date of Patent: Sep. 30, 2025

(54) IMAGE EDGE ENHANCEMENT PROCESSING METHOD AND APPLICATION THEREOF

(71) Applicant: MOLCHIP TECHNOLOGY (SHANGHAI) CO., LTD., Shanghai (CN)

(72) Inventors: He Shan, Shanghai (CN); Sun Deyin, Shanghai (CN)

(73) Assignee: MOLCHIP TECHNOLOGY (SHANGHAI) CO., LTD., Shanghai (CN)

( * ) Notice: Subject to any disclaimer, the term of this patent is extended or adjusted under 35 U.S.C. 154(b) by 375 days.

(21) Appl. No.: 18/171,452

(22) Filed: Feb. 20, 2023

(65) Prior Publication Data

US 2023/0206458 A1 Jun. 29, 2023

Related U.S. Application Data

(63) Continuation of application No. PCT/CN2021/116307, filed on Sep. 2, 2021.

(30) Foreign Application Priority Data

Sep. 8, 2020 (CN) .......................... 202010931595.8

(51) Int. Cl.
*G06T 7/13* (2017.01)
*G06T 5/70* (2024.01)
(Continued)

(52) U.S. Cl.
CPC .................. *G06T 7/13* (2017.01); *G06T 5/70* (2024.01); *G06T 7/90* (2017.01); *G06V 10/25* (2022.01);
(Continued)

(58) Field of Classification Search
CPC .... G06T 7/13; G06T 5/70; G06T 7/90; G06T 2207/10024; G06T 2207/20192;
(Continued)

(56) References Cited

U.S. PATENT DOCUMENTS

2008/0170778 A1* 7/2008 Luo ........................... G06T 5/77
382/164
2008/0187184 A1* 8/2008 Yen ........................... G06T 5/94
382/118
(Continued)

FOREIGN PATENT DOCUMENTS

| CN | 102542538 A | 7/2012 |
| CN | 104346778 A | 2/2015 |
| CN | 109472749 A | 3/2019 |

*Primary Examiner* — Ali Bayat
(74) *Attorney, Agent, or Firm* — Nitin Kaushik

(57) ABSTRACT

This application discloses an image edge enhancement processing method and application thereof. This application relates to the technical field of digital image processing. The method includes: receiving an input image separated into a luminance signal and a chrominance signal; obtaining a first edge value by processing the input luminance image with a first set of parameters applicable to non-facial skin tone points, and obtaining a second edge value by processing the input luminance image with a second set of parameters applicable to facial skin tone points; obtaining a skin tone weight value for each skin tone point, and obtaining the facial skin tone weight value for each point according to the face region information of the input image; blending the first edge value with the second edge value according to the facial skin tone weight value, and combining the blended edge value with the input luminance value for edge enhancement.

10 Claims, 6 Drawing Sheets

(51) Int. Cl.
*G06T 7/90* (2017.01)
*G06V 10/25* (2022.01)
*G06V 10/60* (2022.01)
*G06V 40/16* (2022.01)

(52) U.S. Cl.
CPC ............ *G06V 10/60* (2022.01); *G06V 40/161* (2022.01); *G06T 2207/10024* (2013.01); *G06T 2207/20192* (2013.01); *G06T 2207/30201* (2013.01)

(58) Field of Classification Search
CPC . G06T 2207/30201; G06T 5/73; G06V 10/25; G06V 10/60; G06V 40/161
USPC ......................................................... 382/266
See application file for complete search history.

(56) References Cited

U.S. PATENT DOCUMENTS

| | | | | |
|---|---|---|---|---|
| 2013/0321700 A1* | 12/2013 | Cote | ............... | H04N 5/213 |
| | | | | 348/453 |
| 2013/0322752 A1* | 12/2013 | Lim | ............... | G06T 5/70 |
| | | | | 382/167 |
| 2013/0322753 A1* | 12/2013 | Lim | ............... | G06T 5/73 |
| | | | | 382/167 |

* cited by examiner receiving an input image separated into luminance and chrominance signals, with the luminance signal corresponding to the input luminance image and the chrominance signal corresponding to the input chrominance image ⸺S100 a first edge value is obtained by processing the input luminance image with a first parameter set applicable to non-facial skin tone points, and a second edge value is obtained by processing the input luminance image with a second parameter set applicable to facial skin tone points; and a skin tone detection is performed on the input chrominance image to obtain a skin tone weight value for each point, and a facial skin tone weight value is obtained for each point based on the face region information of the input image; wherein the facial skin tone weight value of the skin tone point in the face region is equal to the skin tone weight value of that point, while the skin tone weight value for the skin tone point outside the face region is cleared to zero ⸺S200 the first edge value is blended with the second edge value by the aforementioned facial skin tone weight value, and the blended edge value is combined with the input luminance value for edge enhancement ⸺S300

FIG. 1

IMAGE EDGE ENHANCEMENT PROCESSING METHOD AND APPLICATION THEREOF

CROSS-REFERENCE TO RELATED APPLICATIONS

The application claims priority to Chinese patent application No. 202010931595.8, filed on Sep. 8, 2020, the entire contents of which are incorporated herein by reference.

FIELD OF THE TECHNOLOGY

This application relates to the field of digital image processing, and specifically, to an image edge enhancement processing method and application thereof.

BACKGROUND OF THE DISCLOSURE

With the development of digital image processing technology, various methods to improve image quality are applied to video processors to provide high quality video images for users. Wherein, skin tone detection and processing technology is an important branch of video image processing technology. Due to the interference of light, electricity and thermal environment during filming, human skin tone may appear inconsistent with human visual habits, resulting in the discomfort of human eyes. Therefore, it is necessary to detect and correct the skin tone of the human body to make it look healthier and more natural, so as to conforming to the visual habits of human eyes. However, existing skin tone detection and processing methods are usually based on single color space which are easy to implement in hardware, and they are easy to falsely detect the skin-tone-like points in the background as human skin tone points, resulting in a higher false detection rate. On the other hand, the skin tone region of the human face tends to have a lot of details, such as fine lines, acne marks, freckles, and shadow borders, etc. These details generally have relatively weak contrast and does not need to be enhanced too much or too wide, otherwise the human face will look unnatural. While for non-human face parts of the image, such as sceneries, buildings, etc., weak contrast edge should be strongly enhanced to make the details more obvious. If the above two parts of the image use the same enhancement parameters, the final effect cannot achieve a good balance between the two parts.

At present, the prior art also provides face enhancement solutions that distinguish between skin tone points and non-skin tone points, taking the disclosed Chinese patent application CN102542538A as an example, it provides an edge enhancement method: use the method of color detection to distinguish skin tone points and non-skin tone points and attenuates the enhancement strength of skin tone points to improve the face enhancement effect of human face. However, in the above method, color detection can only distinguish skin tone points from non-skin tone points and cannot accurately locate the skin tone points of the human face, hence the false detection rate is still high. As an example, the color of the beige native grain floor in the room is also within the skin tone range, if they are treated as skin tone points and the edge enhancement strength is weakened, then the floor texture that should be enhanced more will not be enhanced effectively, so as to affect the overall enhancement effect of the image.

Based on the above-mentioned prior art, how to improve the edge enhancement effect of facial skin tone points without affecting the edge enhancement effect of non-facial skin tone points is a technical problem needs to be solved urgently at present.

SUMMARY

The purpose of the application is to overcome the deficiencies of the prior art, and to provide an image edge enhancement processing method and application thereof. The application uses independent edge enhancement parameters for facial skin tone points to improve edge enhancement effect without affecting the effect of non-facial skin tone points.

To achieve the above goals, the application provides the following technical solutions:

An image edge enhancement processing method, the method comprising the steps of:

receiving an input image separated into luminance and chrominance signals, with the luminance signal corresponding to the input luminance image and the chrominance signal corresponding to the input chrominance image;

a first edge value is obtained by processing the input luminance image with a first parameter set applicable to non-facial skin tone points, and a second edge value is obtained by processing the input luminance image with a second parameter set applicable to facial skin tone points; a skin tone detection is performed on the input chrominance image to obtain a skin tone weight value for each point, and a facial skin tone weight value is obtained for each point based on the face region information of the input image; wherein the facial skin tone weight value of the skin tone point in the face region is equal to the skin tone weight value of that point, while the skin tone weight value for the skin tone point outside the face region is cleared to zero;

the first edge value is blended with the second edge value by the aforementioned facial skin tone weight value, and the blended edge value is combined with the input luminance value for edge enhancement.

Further, the first parameter set a is a parameter group including edge detection operator, noise suppression parameters and strength adjustment parameters, and the parameter set a is used to perform edge detection, noise suppression, strength adjustment sequentially for the input luminance image to obtain the edge value $E_{2a}$:

the second parameter set b is a parameter group including edge detection operator, noise suppression parameters and strength adjustment parameters, and the parameter set b is used to perform edge detection, noise suppression, strength adjustment sequentially for the input luminance image to obtain the edge value $E_{2b}$:

Further, for a certain point in the image located in the i-th row and the j-th column, denoted as (i,j), the edge value is calculated according to the following formula:

$$E_0(i, j) = \sum_{\substack{-L \leq m \leq L \\ -L \leq n \leq L}} Y_{in}(i+m, j+n) \times C_Q(m+L, n+L),$$

wherein, $E_0(i,j)$ is the edge value at (i,j); $Y_{in}(i,j)$ is the luminance value of the input image at (i,j), and $0 \leq Y_{in}(i,j) \leq 255$; $C_Q$ is the edge detection operator of size Q, and $Q=(2 \times L+1)$, L is a preset value; m, n and L are integers satisfying, wherein $-L \leq m \leq L$ and $-L \leq n \leq L$;

when performing noise suppression, noise in the edge values is removed or attenuated using the following formula:

$$E_1(i, j) = \begin{cases} E_0(i, j) - T_0, & E_0(i, j) > T_0 \\ E_0(i, j) + T_0, & E_0(i, j) < -T_0 \\ 0, & -T_0 \leq E_0(i, j) \leq T_0 \end{cases}$$

wherein, $T_0$ is the noise threshold, and $T_0 > 0$;
when performing strength adjustment, the strength of positive and negative edge values are adjusted respectively using the following formula:

$$E_2(i, j) = \begin{cases} E_1(i, j) \times \text{Gain}_p, & E_1(i, j) > 0 \\ E_1(i, j) \times \text{Gain}_n, & E_1(i, j) < 0 \\ 0, & E_1(i, j) = 0 \end{cases}$$

wherein, parameter $\text{Gain}_p$ is the adjustment gain of the positive edge, and parameter $\text{Gain}_n$ is the adjustment gain of the negative edge, the edge strength is enhanced when the gain is greater than 1, while the edge strength is weakened when the gain is less than 1.

Further, when performing skin tone detection on the input chrominance image, the skin tone is detected in the (H,S) coordinate system, with H indicating the chromaticity of the point and S indicating the saturation of the point;

for a certain point in the image located in the i-th row and the j-th column, denoted as (i,j), $$H(i, j) = \arctan\left(\frac{Cr(i, j)}{Cb(i, j)}\right),$$

$$S(i, j) = \sqrt{Cr(i, j)^2 + Cb(i, j)^2},$$

wherein, $Cr(i,j)$ is the red difference of point (i,j), and $-128 \leq Cr(i,j) \leq 127$; $Cb(i,j)$ is the blue difference of point (i,j), and $-128 \leq Cb(i,j) \leq 127$.

Further, in the (H,S) coordinate system, a rectangular region is determined as a skin tone region by the preset parameters $H_0$, $H_1$, $S_0$ and $S_1$, if the H value and S value of the point (i,j) fall within the rectangular region, the point is considered to be a skin color point, otherwise it is considered as a non-skin color point;

for a skin color point, the skin tone weight value $W_{skin}(i,j)$ is calculated by the following formula:

$$W_h = \begin{cases} 1, & H_0 + D_h \leq H(i, j) \leq H_1 - D_h \\ \dfrac{H(i, j) - H_0}{D_h}, & H(i, j) < H_0 + D_h \\ \dfrac{H_1 - H(i, j)}{D_h}, & H(i, j) > H_1 - D_h \end{cases},$$

$$W_s = \begin{cases} 1, & S_0 + D_s \leq S(i, j) \leq S_1 - D_s \\ \dfrac{S(i, j) - S_0}{D_s}, & S(i, j) < S_0 + D_s \\ \dfrac{S_1 - S(i, j)}{D_s}, & S(i, j) > S_1 - S_s \end{cases},$$

$$W_{skin}(i, j) = \begin{cases} W_h, & W_h \leq W_s \\ W_s, & W_h > W_s \end{cases},$$

wherein, $0 \leq W_{skin}(i,j) \leq 1$, the larger the value is, the more likely the point is considered as a skin tone point; $H_0$, $H_1$, $S_0$, $S_1$, $D_s$ and $D_h$ are preset values satisfying, and $H_0+2\times D_h<H_1$ and $S_0+2\times D_s<S_1$; $D_h$ is used to adjust the width of the weight transition interval in the S direction, and $D_h$ is used to adjust the width of the weight transition interval in the H direction;

for non-skin tone points, the corresponding skin tone weight value is $W_{skin}(i,j)=0$.

Further, the steps of obtaining the facial skin tone weight value for each point based on the face region information of the input image is as follows:

step 1, perform face detection on the input image by the face detection unit to obtain the face region information of the input image, for the faces detected in the input image, the k-th ($0 \leq k<N$) face region information is $F(x_k, y_k, w_k, h_k)$, indicating that the coordinates of the upper left corner of the region is $(x_k, y_k)$, and the width of the region is $w_k$, and the height is $h_k$;

step 2, for each point (i,j), from the 0-th face to the (N-1)-th face, determine whether the point falls in the above face region; if the point falls in the region, the face weight value is $W_{face}(i,j)=1$; Otherwise, $W_{face}(i,j)=0$;

step 3, the facial skin tone weight $W(i,j)$ is calculated according to the skin tone weight $W_{skin}(i,j)$ and the face weight $W_{face}(i,j)$ of each point(i,j), as the following formula:

$$W(i, j) = \begin{cases} W_{skin}(i, j), & W_{face}(i, j) = 1 \\ 0, & W_{face}(i, j) = 0 \end{cases}.$$

Further, blend the first edge value $E_{2a}$ with the second edge value $E_{2b}$ by the aforementioned facial skin tone weight $W(i,j)$ to obtain the final edge value $E(i,j)$ for each point, as the following formula:

$$E(i,j)=E_{2a}(i,j)\times(1-W(i,j))+E_{2b}(i,j)D\times W(i,j),$$

and the enhanced edge value $Y_{out}(i,j)$ is obtained by summed the input luminance value $Y_{in}(i,j)$ with the edge value $E(i,j)$, as the following formula:

$$Y_{out}(i,j)=Y_{in}(i,j)+E(i,j)$$

the processed image is obtained as the output luminance image.

Further, the step 2 comprising:
step 21, initialization, let k=0;
step 22, obtain the face region information $F(x_k, y_k, w_k, h_k)$ of the k-th face;
step 23, for the point (i,j), determine whether $x_0 \leq j \leq x_0+w_k$ and $y_0 \leq i \leq y_0+h_k$ are true, if they are true, the point falls in the k-th face region, skip to step 27; otherwise, go to step 24;
Step 24, let k=k+1;
Step 25, determine whether k<N is true, if it is true, skip to step 22; otherwise, go to step 26;
Step 26, let $W_{face}(i,j)=0$, end the judgement of the current point;
Step 27, let $W_{face}(i,j)=1$, end the judgement of the current point.

The application also provides an image edge enhancement processing apparatus, the apparatus comprising:
processor;
memory for storing processor executable instructions and parameters;
the processor includes an edge analysis unit, a skin color analysis unit and an enhancement processing unit;
wherein the edge analysis unit is configured to receive an input image separated into a luminance signal and a chrominance signal, the luminance signal corresponds to the input luminance image and the chrominance signal corresponds to the input luminance image; and to obtain a first edge value by processing the input luminance image with a first set of parameters applicable to non-facial skin tone points, and to obtain a second edge value by processing the input luminance image with a second set of parameters applicable to facial skin tone points values;

and, the skin tone analysis unit is configured to obtain the skin tone weight value of each point by performing skin tone detection on the input chroma image, and obtain the facial skin tone weight value of each point based on the face region information of the input image; wherein the facial skin tone weight value of the skin tone point within the face region is equal to the skin tone weight value of that point, while the skin tone weight value for the skin tone point outside the face region is cleared to zero;

and, the enhancement processing unit is configured to blend the first edge value with the second edge value by the aforementioned facial skin tone weight value, and combining the blended edge value with the input luminance value for edge enhancement.

The application also provides an image edge enhancement processing system, the system comprising an edge detection unit and an edge enhancement unit, wherein the system further comprises a face region modulation unit between the edge detection unit and the edge enhancement unit, and the face region modulation unit is connected to a skin tone detection unit;

wherein the skin tone detection unit is configured to:
perform the skin tone detection on the input chrominance image to obtain the skin tone weight value of each point, and obtain the facial skin tone weight value of each point according to the face region information of the input image; wherein the facial skin tone weight value of the skin tone point in the face region is equal to the skin tone weight value of that point, while the skin tone weight value for the skin tone point outside the face region is cleared to zero;

and the face region modulation unit is configured to: obtain a first edge value by processing the input luminance image with a first set of parameters applicable to non-facial skin tone points and a second edge value by processing the input luminance image with a second set of parameters applicable to facial skin tone points; and blend the first edge value with the second edge value by the aforementioned facial skin tone weight value and transfer the blended edge value to the edge enhancement unit for edge enhancement.

Compared with the prior art, the application has the following advantages and positive effects due to the adoption of the above technical solutions, as an example: using an independent set of edge enhancement parameters for the skin tone points within the face region, so as to improve the edge enhancement effect of facial skin tone points without affecting the skin tone points outside the face region.

Compared with existing methods of skin tone detection (all points falling within the skin tone range are treated as skin tone points, and the false detection rate is relatively high), the scheme provided in the application combines face detection and skin tone detection to accurately locate facial skin tone points, hence it can significantly reduce the false detection rate by excluding non-facial skin tone points. On the other hand, by using different edge enhancement parameters for facial skin tone points and non-facial skin tone points, preferably including edge detection parameters, noise parameters, and strength parameters, the application can more finely distinguish between skin tone points and non-skin tone points. The enhancement effect is also convenient for the user to flexibly adjust according to the characteristics and preferences of the human face, with wide applicability and strong flexibility.

BRIEF DESCRIPTION OF THE DRAWINGS

FIG. 1 is a flowchart of the image edge enhancement method provided by the application.

DETAILED DESCRIPTION

Figure 2:
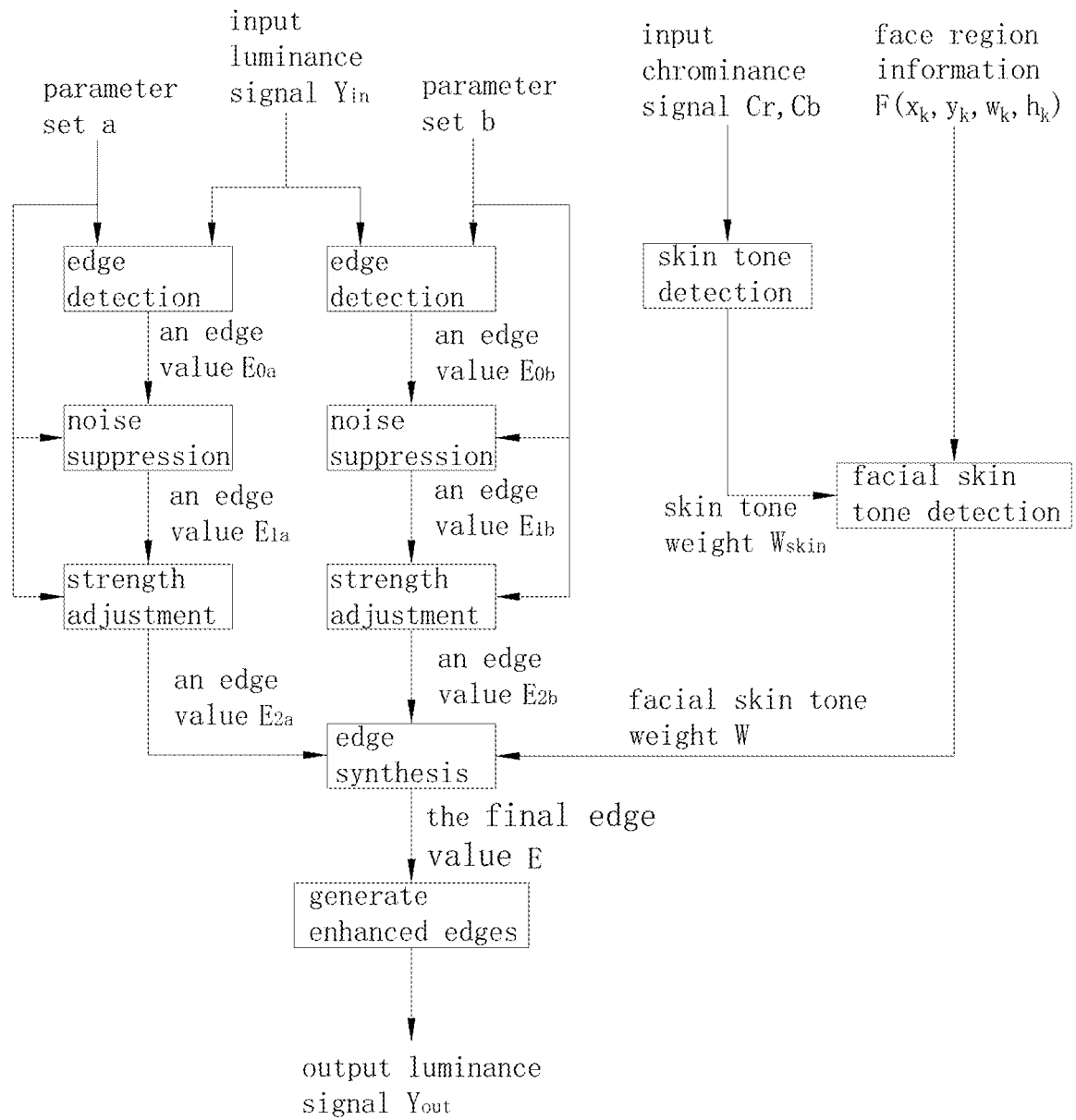
FIG. 2 is a flowchart of information processing of an image edge enhancement method provided by the embodiment of the application.

The image edge enhancement processing method and application thereof disclosed in the application will be further described in detail below with reference to the accompanying drawings and specific embodiments. It should be noted that the combinations of technical features or technical features described in the following embodiments should not be considered as isolated, and they may be combined with each other to achieve better technical results. In the accompanying drawings of the following embodiments, the same symbols appearing in each of the accompanying drawings represent the same features or components that can be applied in different embodiments. Thus, once an item is defined in one of the accompanying drawings, no further discussion of it is required in subsequent drawings.

It should be noted that the structures, proportions, dimensions. etc. shown in the attached drawings of this specification are only for the purpose of understanding and reading by those skilled in the art in accordance with the contents disclosed in this specification, and are not intended to limit the conditions under which the application can be implemented. Any modification of the structure, change of the proportion relationship, or adjustment of the size, without affecting the efficacy and purpose of the application, should fall within the scope of the technical content disclosed by the application. The scope of the preferred embodiments of the application includes alternative implementations in which the functions may be performed out of the order described or discussed, including performing the functions in a substantially simultaneous manner or in the reverse order depending upon the functions involved, which should be embodiments of the invention will be understood by those skilled in the art to which the embodiments of the invention pertain.

Techniques, methods and devices known to those of ordinary skill in the relevant art may not be discussed in detail, but where appropriate, such techniques, methods, and devices should be considered part of the authorized description. In all examples shown and discussed herein, any specific value should be construed as illustrative only and not as limiting. Accordingly, other examples of exemplary embodiments may have different values.

EMBODIMENTS

FIG. 1 provides an image edge enhancement processing method for this embodiment. The method includes the steps of:

S100, receive an input image separated into a luminance signal and a chrominance signal, the luminance signal corresponding to the input luminance image and the chrominance signal corresponding to the input chrominance image.

In this embodiment, the image data that is separated into luminance signal and chrominance signal may be one of YCbCr image data, HSV image data, and HIS image data. For example, in the case of YCbCr image data, the luminance signal is Y and the chrominance signal are Cr and Cb. The luminance signal refers to the electrical signal that represents the brightness of the picture in a video system. When transmitting signals in a video system, the signal representing chrominance information is usually overlapped with the luminance signal to save the frequency bandwidth of the transmitted signal. In this case, the signal representing the luminance information is referred to as the Y signal, and the signal component representing the chrominance information is referred to as the C signal.

Hereinafter, for convenience of description, YCbCr image data is described as an example.

As shown in FIG. 2, the input image is separated into an input luminance image corresponding to the luminance signal (i.e., $Y_{in}$) and an input chrominance image corresponding to the chrominance signal (i.e., Cr and Cb).

S200, a first edge value is obtained by processing the input luminance image with a first parameter set applicable to non-facial skin tone points, and a second edge value is obtained by processing the input luminance image with a second parameter set applicable to facial skin tone points; and a skin tone detection is performed on the input chrominance image to obtain a skin tone weight value for each point, and a facial skin tone weight value is obtained for each point based on the face region information of the input image. Wherein the skin tone weight value of the skin tone point within the face region is equal to the skin tone weight value of the point, while the skin tone weight value for the skin tone point outside the face region is cleared to zero.

In a preferred embodiment, the first parameter set is a parameter group a including an edge detection operator, noise suppression parameters and strength adjustment parameters and the parameter set a is used to sequentially perform edge detection, noise suppression, and strength adjustment on an input luminance image to obtain an edge value $E_{2a}$.

the second parameter set is a parameter group b including an edge detection operator, noise suppression parameters and strength adjustment parameters and the parameter set b is used to sequentially perform edge detection, noise suppression, and strength adjustment on an input luminance image to obtain an edge value $E_{2b}$.

When skin tone detection is performed on the input luminance image, the skin tone weight is calculated for each point. And a higher weight value indicates a higher probability of being a skin tone point.

Then based on the face region information (including the face position and size information) of the input image, the skin tone points in the non-face region are excluded, i.e., only the skin tone weights of the face region points are retained, and the weights of skin tone points outside the face region are cleared to zero.

S300, the first edge value is blended with the second edge value by the aforementioned facial skin tone weight value, then the blended edge value is combined to the input luminance value for edge enhancement.

After obtaining the facial skin tone weight values for each point, the obtained edge values $E_{2a}$ and $E_{2b}$ are blended by facial skin tone weight value to obtain the final edge value. And then the final edge value is applied to the input luminance value to obtain the edge-enhanced luminance value.

The technical solution provided by this embodiment is described in detail below with the FIG. 2 to FIG. 6.

1) Edge Detection

For a certain point in the image located at the i-th row and the j-th column, denoted as (i,j), the edge value is calculated according to the following formula:

$$E_0(i, j) = \sum_{-L \leq m \leq L}^{-L \leq n \leq L} Y_{in}(i + m, j + n) \times C_Q(m + L, n + L).$$

Wherein, $E_0(i,j)$ is the edge value of the point $(i,j)$; $Y_{in}(i,j)$ is the luminance value of the input image at point $(i,j)$, and $0 < Y_{in}(i,j) \leq 255$; $C_Q$ is the edge detection operator of size Q, and $Q=(2 \times L+1)$, L is a preset value; m, n and L are integers satisfying, wherein $-L \leq m \leq L$ and $-L \leq n \leq L$.

As examples rather than restrictions, the following are examples of edge detection operators of size 3 and 5 with L=1 and L=2, respectively.

When L=1, Q=3, the edge value $E_0(i,j)$ of each point is calculated using the 3×3 edge detection operator $C_3$. As an example, the typical values for $C_3$ are as follows:

$$C_3 = \begin{pmatrix} -1 & -2 & -1 \\ -2 & 12 & -2 \\ -1 & -2 & -1 \end{pmatrix}.$$

When L=2, Q=5, the edge value $E_0(i,j)$ of each point is calculated using the 5×5 edge detection operator $C_5$. As an example, the typical values for $C_5$ are as follows:

$$C_5 = \begin{pmatrix} 0 & -2 & -2 & -2 & 0 \\ -2 & -3 & 2 & -3 & -2 \\ -2 & 2 & 28 & 2 & -2 \\ -2 & -3 & 2 & -3 & -2 \\ 0 & -2 & -2 & -2 & 0 \end{pmatrix}.$$

It should be noted that the above $C_3$ and $C_5$ are not unique, those skilled in the art can select and adjust the computing matrix of edge detection operator $C_Q$ according to their needs. Users can preset the computing matrix corresponding to the edge detection operator $C_Q$ which size is Q in memory. The corresponding computing matrix is used according to the Q value (calculated by L value) when needed.

2) Edge Noise Suppression

When performing noise suppression, noise in edge values can be removed or attenuated using the following formula:

$$E_1(i, j) = \begin{cases} E_0(i, j) - T_0, & E_0(i, j) > T_0 \\ E_0(i, j) + T_0, & E_0(i, j) < -T_0 \\ 0, & -T_0 \leq E_0(i, j) \leq T_0 \end{cases}$$

Wherein, $T_0$ is the noise threshold and $T_0 > 0$.

3) Edge Strength Adjustment

When adjusting the strength, the following formula can be used to adjust the strength of the positive and negative edges respectively:

$$E_2(i, j) = \begin{cases} E_1(i, j) \times \text{Gain}_p, & E_1(i, j) > 0 \\ E_1(i, j) \times \text{Gain}_n, & E_1(i, j) < 0 \\ 0, & E_1(i, j) = 0 \end{cases}$$

Wherein, the parameter $\text{Gain}_p$ is the adjustment gain for the positive edge and the parameter $\text{Gain}_p$ is the adjustment gain for the negative edge.

The edge strength is enhanced when the gain is greater than 1, while the edge strength is weakened when the gain is less than 1.

4) Skin Tone Detection

In this embodiment, it is preferable to detect the skin tone in the (H,S) coordinate system when detecting the skin tone of an input chrominance image. Said H is used to describe the chromaticity of the point, and said S is used to describe the saturation of the point.

Specifically, for a certain point of the image located at the i-th row and the j-th column, denoted as (i,j), the corresponding H and S values are calculated using the following formula:

$$H(i, j) = \arctan\left(\frac{Cr(i, j)}{Cb(i, j)}\right),$$

$$S(i, j) = \sqrt{Cr(i, j)^2 + Cb(i, j)^2}.$$

Wherein, $Cr(i,j)$ is the value of red difference at point (i,j), and $-128 \leq Cr(i,j) \leq 127$; $Cb(i,j)$ is the value of blue difference at point (i,j), and $-128 \leq Cb(i,j) \leq 127$.

Figure 3:
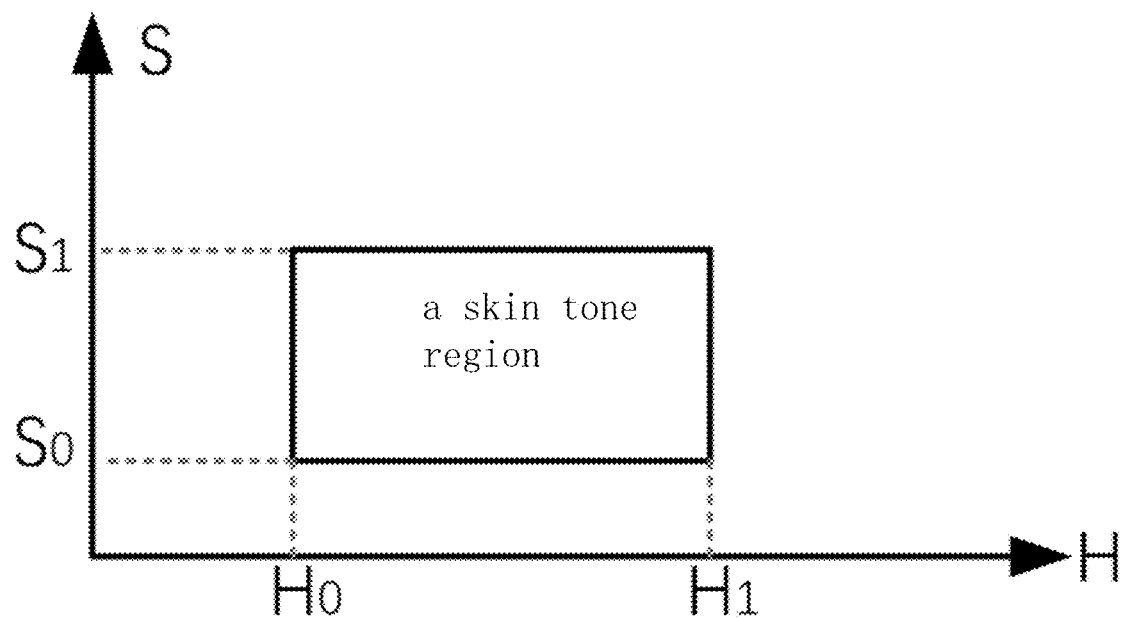
FIG. 3 is a schematic diagram of the skin tone region schematic diagram in the (H,S) coordinate system provided by the application.

During implementation, a rectangular region can be determined as a skin tone region by preset parameter values of $H_0$, $H_1$, $S_0$ and $S_1$ in the (H,S) coordinate system, as shown in FIG. 3.

If the H and S values of the current point (i,j) fall within the rectangular region in the (H,S) coordinates system, the point is considered as a skin tone point, otherwise it is considered as a non-skin tone point.

That is, when $H_0 \leq H(i,j) \leq H_1$ and $S_0 \leq S(i,j) \leq S_1$, it can be determined that the current point falls within the skin tone region, namely the skin tone point, while, the skin tone weight $W_{skin}(i,j)$ at point (i,j) can be calculated by the following formula:

$$W_h = \begin{cases} 1, & H_0 + D_h \leq H(i, j) \leq H_1 - D_h \\ \dfrac{H(i, j) - H_0}{D_h}, & H(i, j) < H_0 + D_h \\ \dfrac{H_1 - H(i, j)}{D_h}, & H(i, j) > H_1 - D_h \end{cases},$$

$$W_s = \begin{cases} 1, & S_0 + D_s \leq S(i, j) \leq S_1 - D_s \\ \dfrac{S(i, j) - S_0}{D_s}, & S(i, j) < S_0 + D_s \\ \dfrac{S_1 - S(i, j)}{D_s}, & S(i, j) > S_1 - D_s \end{cases},$$

-continued $$W_{skin}(i, j) = \begin{cases} W_h, & W_h \leq W_s \\ W_s, & W_h > W_s \end{cases}.$$

Wherein, $0 \leq W_{skin}(i,j) \leq 1$, the greater the value, the higher probability that the point is considered as a skin tone point. $H_0$, $H_1$, $S_0$, $S_1$, $D_s$, $D_h$ are preset values satisfying $H_0 + 2 \times D_h < H_1$ and $S_0 + 2 \times D_s < S_1$.

Figure 4:
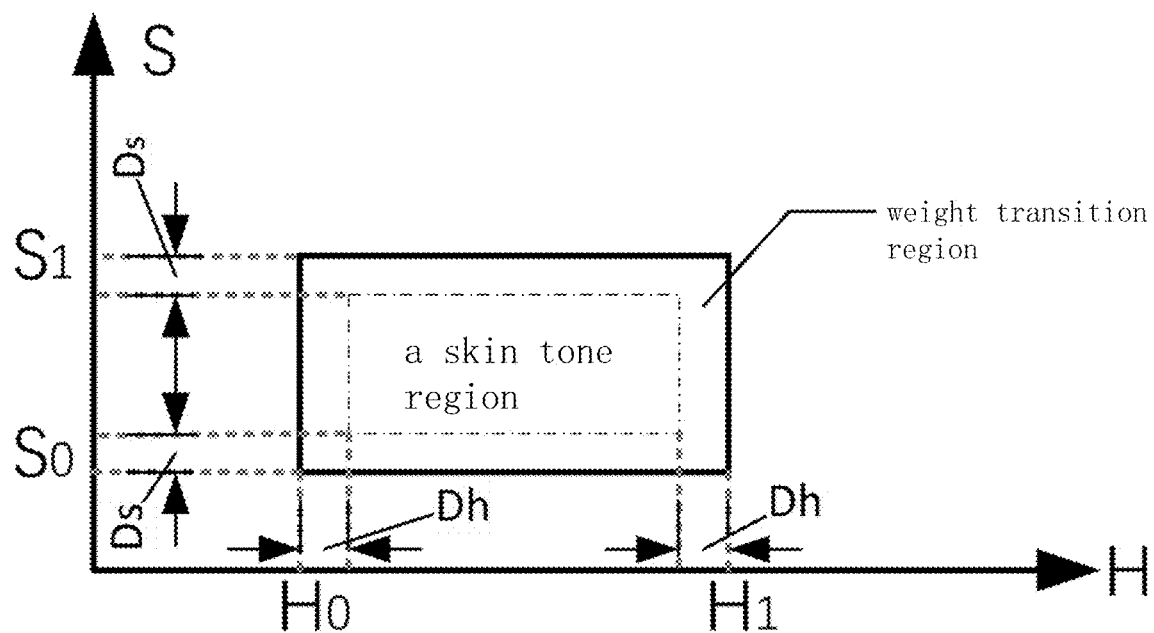
FIG. 4 is a schematic diagram of the weight transition zone schematic diagram in the (H,S) coordinate system provided by the application.
Figure 5:
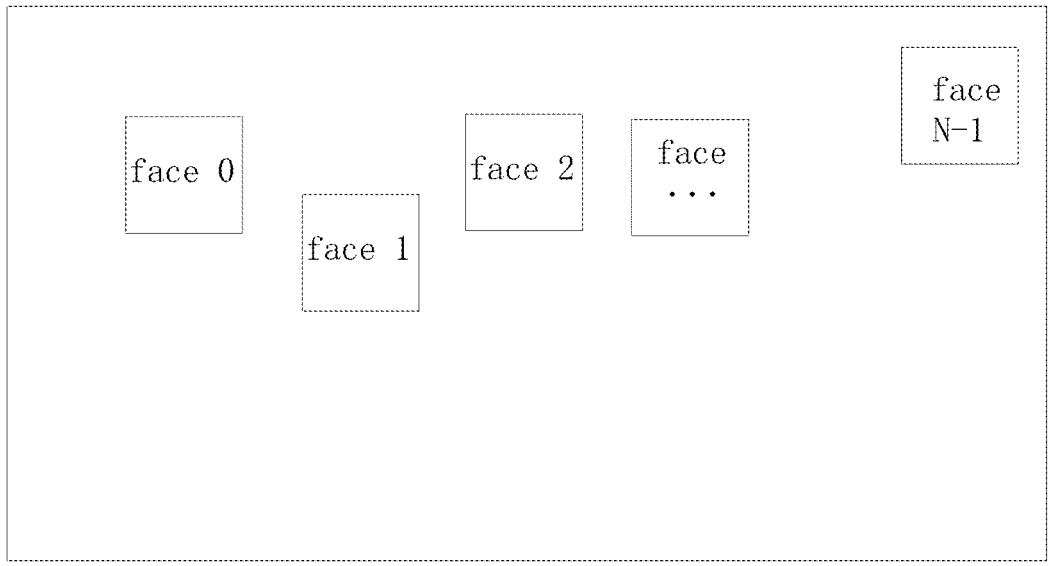
FIG. 5 is an example diagram of the detected face region schematic diagram provided by the application.

The parameter $D_s$ is used to adjust the width of the weighted transition interval in the S direction, and the parameter $D_h$ is used to adjust the width of the weighted transition interval in the H direction, as shown in FIG. 4. Wherein, users can personalize the parameter values of $H_0$, $H_1$, $S_0$, $S_1$, $D_s$ and $D_h$, or adaptively adjust the parameter values of $H_0$, $H_1$, $S_0$, $S_1$, $D_s$ and $D_h$ through the system.

For the points that do not fall into the above skin tone region (i.e., non-skin tone points), the corresponding skin tone weight is $W_{skin}(i,j)=0$, i.e., the skin tone weight value of non-skin tone points is uniformly set to zero.

5) Facial Skin Tone Detection

Face detection results can be derived from dedicated face detection units. For example, mobile phones and monitoring applications usually set up the face detection unit. Face region information can be obtained from face detection results, including face location (usually represented by coordinates) and size information (usually represented by width and height).

In this embodiment, the steps of obtaining the facial skin tone weight value of each point according to the face region information of the input image are as follows:

Step 1, the input image is detected by the face detection unit and the face region information of the input image is acquired. As examples rather than restrictions, see FIG. 5, for example, N faces are detected in the processed image, which are face 0, face 1, face 2, . . . , face N-1. Wherein, the k-th ($0 \leq k < N$) face region information is $F(x_k, y_k, w_k, h_k)$, indicating the upper left corner coordinate is $(x_k, y_k)$, and the width of the region is $w_k$, the height is $h_k$.

Step 2, for each point (i,j) in the image, it is determined whether the point falls in the above face region from the 0-th face to the (N-1)-th face. When it is determined that a point falls in the above face region, the face weight of the point is $W_{face}(i,j)=1$. When it is determined that the point does not fall in the above face region, the face weight of the point is $W_{face}(i,j)=0$.

Figure 6:
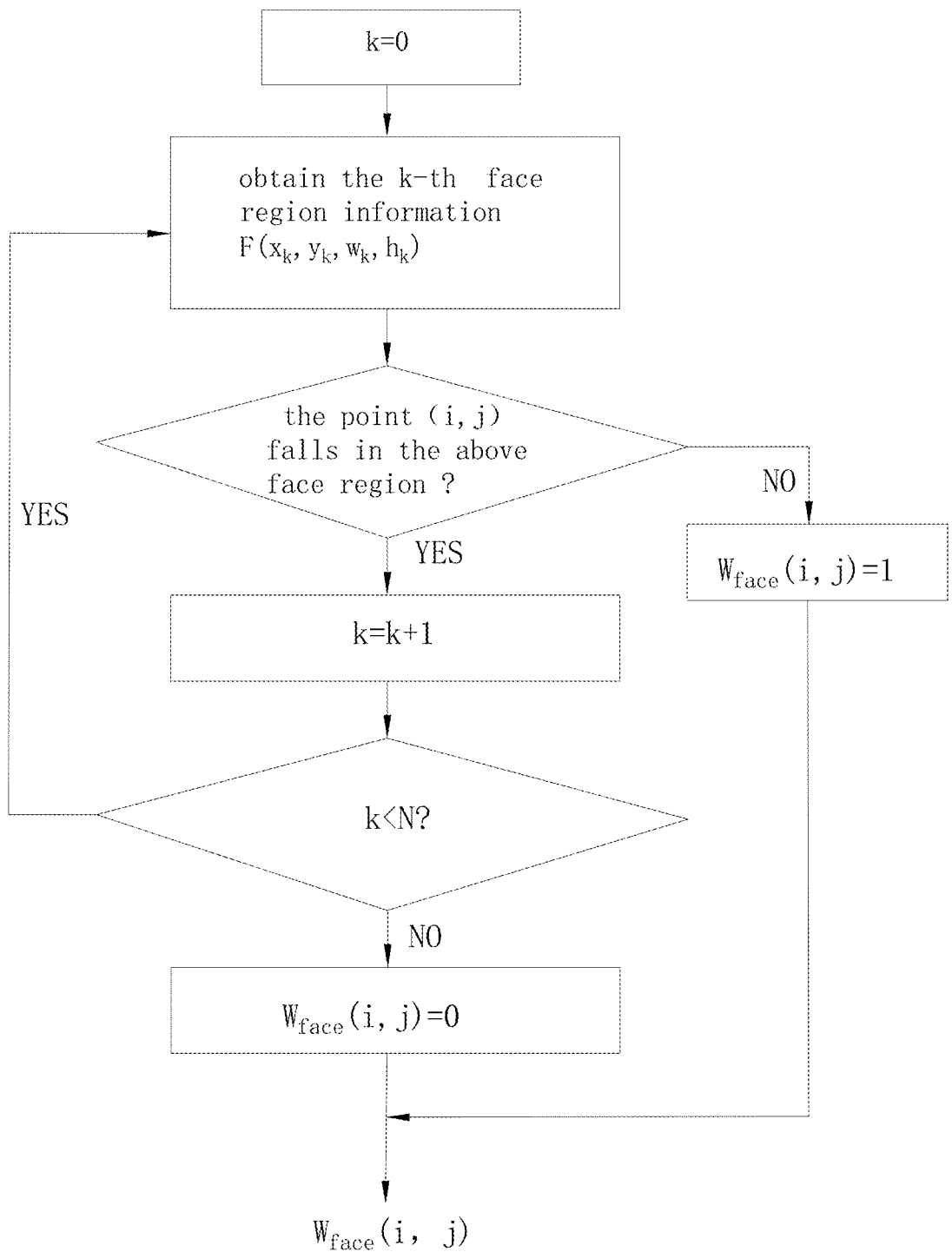
FIG. 6 is a flowchart for detecting whether a point falls into a face region provided by the application.

The specific determination steps will be described in conjunction with FIG. 6.

Step 21, initialize, let k=0.

Step 22, get the face region information $F(x_k, y_k, w_k, h_k)$ of the k-th face.

Step 23, for the point (i,j), determine whether $x_0 \leq j \leq x_0 + w_k$ and $y_0 \leq i \leq y_0 + h_k$ are true. If they are true, the point falls in the k-th face region and skips to step 27; otherwise, proceed to step 24.

Step 24, let k=k+1.

Step 25, determine whether k<N is true. If it is true, skip to step 22; otherwise, proceed to step 26.

Step 26, set $W_{face}(i,j)=0$, end the judgement of the current point.

Step 27, sets $W_{face}(i,j)=1$, end the judgement of the current point.

Step 3, finally, according to the skin tone weight $W_{skin}(i,j)$ and face weight $W_{face}(i,j)$, the facial skin tone weight $W(i,j)$ for each point is calculated according to the foll win formula $$W(i, j) = \begin{cases} W_{skin}(i, j), & W_{face}(i, j) = 1 \\ 0, & W_{face}(i, j) = 0 \end{cases}.$$

6) Edge Synthesis

The final edge value is obtained by blending $E_{2a}(i,j)$ with $E_{2b}(i,j)$ using the weighting value $W(i,j)$.

Specifically, blend the first edge value $E_{2a}$ with the second edge value $E_{2b}$ by the aforementioned facial skin tone weight $W(i,j)$ to obtain the final edge value $E(i,j)$ for each point according to the following formula:

$$E(i,j)=E_{2a}(i,j)\times(1-W(i,j))+E_{2b}(i,j)\times W(i,j)$$

7) Generate Enhanced Edges

The final edge value $E(i,j)$ of each point is summed with the input luminance value for edge enhancement according to the following formula:

$$Y_{out}(i,j)=Y_{in}(i,j)+E(i,j)$$

Then, the processed image can be obtained and output as the output luminance image.

The above technical solution provided by the application combines face detection and skin tone detection to accurately locate the skin points of the human face, and can significantly reduce the false detection rate by excluding the non-facial skin tone points. Further, by using different edge enhancement parameters for facial skin tone points and non-facial skin tone points, preferably including edge detection parameters, noise parameters, and strength parameters, the application can more finely distinguish between skin tone points and non-skin tone points. The enhancement effect is also convenient for the user to flexibly adjust according to the characteristics and preferences of the human face, with wide applicability and strong flexibility.

Another embodiment of the application also provides an image edge enhancement processing apparatus. The apparatus comprises a processor and a memory for storing processor executable instructions and parameters.

Wherein, the processor comprises an edge analysis unit, a skin tone analysis unit, and an enhancement processing unit.

Wherein the edge analysis unit is configured to receive an input image separated into a luminance signal and a chrominance signal, the luminance signal corresponds to the input luminance image and the chrominance signal corresponds to the input luminance image; and to obtain a first edge value by processing the input luminance image with a first set of parameters applicable to non-facial skin tone points, and to obtain a second edge value by processing the input luminance image with a second set of parameters applicable to facial skin tone points values.

And the skin tone analysis unit is configured to detect the skin tone points of the input chrominance image and obtain the skin tone weight of each point, and to obtain the facial skin tone weight based on the face region information of the input image; Wherein the facial skin tone weight value of the skin tone point in the face region is equal to the skin tone weight value of the point, and the facial skin tone weight value of the skin tone point outside the face region is cleared to zero.

And the enhancement processing unit is configured to blend the first edge value with the second edge value by the aforementioned skin tone weight value, and to combine the blended edge value with input luminance value for edge enhancement.

In this embodiment, the edge analysis unit may further include an edge detection sub-unit, a noise suppression sub-unit and a strength adjustment sub-unit.

Wherein the edge detection sub-unit is configured to: for a point in the image at the i-th row and the j-th column, denoted as (i,j), the edge value of the point is calculated according to the following formula:

$$E_0(i, j) = \sum_{-L \le m \le L}^{-L \le n \le L} Y_{in}(i+m, j+n) \times C_Q(m+L, n+L).$$

Wherein, $E_0(i,j)$ is the edge value at $(i,j)$; $Y_{in}(i,j)$ is the luminance value of the input image at $(i,j)$, and $0 \le Y_{in}(i,j) \le 255$; $C_Q$ is the edge detection operator of size Q, $Q=(2\times L+1)$, L is a preset value; m, n and L are integers satisfying, wherein $-L \le m \le L$ and $-L \le n \le L$.

The noise suppression sub-unit is configured to remove or attenuate the noise in the edge values using the following formula:

$$E_1(i, j) = \begin{cases} E_0(i, j) - T_0, & E_0(i, j) > T_0 \\ E_0(i, j) + T_0, & E_0(i, j) < -T_0 \\ 0, & -T_0 \le E_0(i, j) \le T_0 \end{cases}.$$

Wherein, $T_0$ is the noise threshold, and $T_0 > 0$.

The edge strength sub-unit is configured to adjust the strength of positive and negative edges respectively using the following formula:

$$E_2(i, j) = \begin{cases} E_1(i, j) \times \text{Gain}_p, & E_1(i, j) > 0 \\ E_1(i, j) \times \text{Gain}_n, & E_1(i, j) < 0 \\ 0, & E_1(i, j) = 0 \end{cases}.$$

Wherein, the parameter $\text{Gain}_p$ is the adjustment gain for the positive edge and the parameter $\text{Gain}_n$ is the adjustment gain for the negative edge.

The edge strength is enhanced when the gain is greater than 1, while the edge strength is weakened when the gain is less than 1.

The skin tone analysis unit may further include a skin tone detection sub-unit and a facial skin tone detection sub-unit.

The skin tone detection sub-unit is configured to: detect skin tone points in the (H,S) coordinate system; Wherein, for a point at the i-th row and j-th column, denoted as (i,j), the corresponding H and S values are obtained according to the following formula:

$$H(i, j) = \arctan\left(\frac{Cr(i, j)}{Cb(i, j)}\right),$$

$$S(i, j) = \sqrt{Cr(i, j)^2 + Cb(i, j)^2}.$$

Wherein, $Cr(i,j)$ is the value of red difference at point $(i,j)$, and $-128 \le Cr(i,j) \le 127$; $Cb(i,j)$ is the value of blue difference at point $(i,j)$, and $-128 \le Cb(i,j) \le 127$.

Said skin tone detection sub-unit is further configured to determine whether the H and S values of point (i,j) fall within the skin tone region in the (H,S) coordinate system. If they fall within the skin tone region, the point is considered as a skin tone point, otherwise it is considered as a non-skin tone point.

For a skin tone point, the skin tone weight value $W_{skin}(i,j)$ is calculated by the following formula:

$$W_h = \begin{cases} 1, & H_0 + D_h \le H(i,j) \le H_1 - D_h \\ \dfrac{H(i,j) - H_0}{D_h}, & H(i,j) < H_0 + D_h \\ \dfrac{H_1 - H(i,j)}{D_h}, & H(i,j) > H_1 - D_h \end{cases},$$

$$W_s = \begin{cases} 1, & S_0 + D_s \le S(i,j) \le S_1 - D_s \\ \dfrac{S(i,j) - S_0}{D_s}, & S(i,j) < S_0 + D_s \\ \dfrac{S_1 - S(i,j)}{D_s}, & S(i,j) > S_1 - D_s \end{cases},$$

$$W_{skin}(i,j) = \begin{cases} W_h, & W_h \le W_s \\ W_s, & W_h > W_s \end{cases}.$$

Wherein, $0 \le W_{skin}(i,j) \le 1$, the greater the value, the higher probability that the point is considered as a skin tone point. $H_0$, $H_1$, $S_0$, $S_1$, $D_s$, $D_h$ are preset values satisfying $H_0 + 2 \times D_h < H_1$ and $S_0 + 2 \times D_s < S_1$.

For non-skin tone points, the corresponding skin-tone weight is $W_{skin}(i,j) = 0$.

The facial skin tone detection sub-unit is configured to: detect faces on the input image through a face detection unit, and get the face region information. Wherein, the k-th ($0 \le k < N$) face region information is $F(x_k, y_k, w_k, h_k)$, indicating the upper left corner coordinate is $(x_k, y_k)$, and the width of the region is $w_k$, the height is $h_k$. For each point (i,j) in the image, it is determined whether the point falls in the above face region from the 0-th face to the (N-1)-th face. When it is determined that the point falls in the above face region, the face weight of the point is $W_{face}(i,j) = 1$. When it is determined that the point does not fall in the above face region, the face weight of the point is $W_{face}(i,j) = 0$. And, calculate the facial skin tone weights $W(i,j)$ for each point based on the skin tone weights $W_{skin}(i,j)$ and face weight $W_{face}(i,j)$ for each point according to the following formula:

$$W(i,j) = \begin{cases} W_{skin}(i,j), & W_{face}(i,j) = 1 \\ 0, & W_{face}(i,j) = 0 \end{cases}.$$

The enhancement processing unit comprises an edge synthesis sub-unit and an edge enhancement sub-unit.

The edge synthesis sub-unit is configured to blend the first edge value $E_{2a}$ with the second edge value $E_{2b}$ by the aforementioned facial skin tone weight $W(i,j)$ to obtain the final edge value $E(i,j)$ for each point according to the following formula:

$$E(i,j) = E_{2a}(i,j) \times (1 - W(i,j)) + E_{2b}(i,j) \times W(i,j).$$

The edge enhancement sub-unit is configured to sum the input luminance $Y_{in}(i,j)$ with the edge value $E(i,j)$ to obtain the output luminance value according to the following formula:

$$Y_{out}(i,j) = Y_{in}(i,j) + E(i,j)$$

Another embodiment of the application provides an image edge enhancement processing system. The system comprises an edge detection unit and an edge enhancement unit, and a face region modulation unit arranged between the edge detection unit and the edge enhancement unit. The face region modulation unit is connected to the skin tone detection unit.

The skin tone detection unit is configured to: perform the skin tone detection on the input chrominance image to obtain the skin tone weight value of each point, and obtain the facial skin tone weight value of each point according to the face region information of the input image. Therein the facial skin tone weight value of the skin tone point in the face region is equal to the skin tone weight value of that point, while the facial skin tone weight value of the skin tone point outside the face region is cleared to zero.

The face region modulation unit is configured to: obtain a first edge value by processing the input luminance image with a first set of parameters applicable to non-facial skin tone points and a second edge value by processing the input luminance image with a second set of parameters applicable to facial skin tone points; and blend the first edge value with the second edge value by the aforementioned facial skin tone weight value and transfer the blended edge value to the edge enhancement unit for edge enhancement.

Other technical features are described in the previous embodiment, and said units of the system may be configured to include multiple sub-units for the information processing described in the previous embodiment, which will not be reiterated here.

In the above description, the disclosure of the application is not intended to limit itself in these respects. Rather, the various components may be selectively and operatively combined in any number within the intended scope of this disclosure. Additionally, terms like "comprising", "including" and "having" should by default be construed as inclusive or open, rather than exclusive or closed, unless explicitly defined to the contrary. All technical, scientific or other terms have the meaning as understood by those skilled in the art unless they are defined to the contrary. Common terms found in dictionaries should not be interpreted too ideally or too practically in the context of related technical documents, unless this disclosure explicitly defines them as such. Any changes and modifications made by those of ordinary skill in the field of the application according to the above disclosure fall within the protection scope of the claims.

What is claimed is:

1. An image edge enhancement processing method, the method comprising:
   receiving an input image separated into luminance and chrominance signals, with the luminance signal corresponding to the input luminance image and the chrominance signal corresponding to the input chrominance image;
   a first edge value is obtained by processing the input luminance image with a first parameter set applicable to non-facial skin tone points, and a second edge value is obtained by processing the input luminance image with a second parameter set applicable to facial skin tone points; and a skin tone detection is performed on the input chrominance image to obtain a skin tone weight value for each point, and a facial skin tone weight value is obtained for each point based on the face region information of the input image; wherein the facial skin tone weight value of the skin tone point in the face region is equal to the skin tone weight value of that point, while the skin tone weight value for the skin tone point outside the face region is cleared to zero;
   the first edge value is blended with the second edge value by the aforementioned facial skin tone weight value, and the blended edge value is combined with the input luminance value for edge enhancement.

2. The method according to claim 1, further comprising:
   the first parameter set a is a parameter group including edge detection operator, noise suppression parameters and strength adjustment parameters, and the parameter set a is used to perform edge detection, noise suppression, strength adjustment sequentially for the input luminance image to obtain the edge value $E_{2a}$;

the second parameter set b is a parameter group including edge detection operator, noise suppression parameters and strength adjustment parameters, and the parameter set b is used to perform edge detection, noise suppression, strength adjustment sequentially for the input luminance image to obtain the edge value $E_{2b}$.

3. The method according to claim 2, further comprising:

for a certain point in the image located in the i-th row and the j-th column, denoted as (i,j), the edge value is calculated according to the following formula:

$$E_0(i,j) = \sum_{-L \le m \le L}^{-L \le n \le L} Y_{in}(i+m, j+n) \times C_Q(m+L, n+L),$$

wherein, $E_0(i,j)$ is the edge value at (i,j); $Y_{in}(i,j)$ is the luminance value of the input image at (i,j), and $0 \le Y_{in}(i,j) \le 255$; $C_Q$ is the edge detection operator of size Q, and $Q=(2\times L+1)$, L is a preset value; m, n and L are integers satisfying, wherein $-L \le m \le L$ and $-L \le n \le L$;

when performing noise suppression, noise in the edge values is removed or attenuated using the following formula:

$$E_1(i,j) = \begin{cases} E_0(i,j) - T_0, & E_0(i,j) > T_0 \\ E_0(i,j) + T_0, & E_0(i,j) < -T_0 \\ 0, & -T_0 \le E_0(i,j) \le T_0 \end{cases}$$

wherein, $T_0$ is the noise threshold, and $T_0>0$;

when performing strength adjustment, the strength of positive and negative edge values are adjusted respectively using the following formula:

$$E_2(i,j) = \begin{cases} E_1(i,j) \times \text{Gain}_p, & E_1(i,j) > 0 \\ E_1(i,j) \times \text{Gain}_n, & E_1(i,j) < 0 \\ 0, & E_1(i,j) = 0 \end{cases}$$

wherein, parameter $\text{Gain}_p$ is the adjustment gain of the positive edge, and parameter $\text{Gain}_n$ is the adjustment gain of the negative edge, the edge strength is enhanced when the gain is greater than 1, while the edge strength is weakened when the gain is less than 1.

4. The method according to claim 3, further comprising:

when performing skin tone detection on the input chrominance image, the skin tone is detected in the (H,S) coordinate system, with H indicating the chromaticity of the point and S indicating the saturation of the point;

for a certain point in the image located in the i-th row and the j-th column, denoted as (i,j), $$H(i,j) = \arctan\left(\frac{Cr(i,j)}{Cb(i,j)}\right),$$

$$S(i,j) = \sqrt{Cr(i,j)^2 + Cb(i,j)^2},$$

wherein, $Cr(i,j)$ is the red difference of point (i,j), and $-128 \le Cr(i,j) \le 127$; $Cb(i,j)$ is the blue difference of point (i,j), and $-128 \le Cb(i,j) \le 127$.

5. The method according to claim 4, further comprising:

in the (H,S) coordinate system, a rectangular region is determined as a skin tone region by the preset parameters $H_0$, $H_1$, $S_0$ and $S_1$, if the H value and S value of the point (i,j) fall within the rectangular region, the point is considered to be a skin color point, otherwise it is considered as a non-skin color point;

for a skin color point, the skin tone weight value $W_{skin}(i,j)$ is calculated by the following formula:

$$W_h = \begin{cases} 1, & H_0 + D_h \le H(i,j) \le H_1 - D_h \\ \dfrac{H(i,j) - H_0}{D_h}, & H(i,j) < H_0 + D_h \\ \dfrac{H_1 - H(i,j)}{D_h}, & H(i,j) > H_1 - D_h \end{cases},$$

$$W_s = \begin{cases} 1, & S_0 + D_s \le S(i,j) \le S_1 - D_s \\ \dfrac{S(i,j) - S_0}{D_s}, & S(i,j) < S_0 + D_s \\ \dfrac{S_1 - S(i,j)}{D_s}, & S(i,j) > S_1 - D_s \end{cases},$$

$$W_{skin}(i,j) = \begin{cases} W_h, & W_h \le W_s \\ W_s, & W_h > W_s \end{cases}.$$

wherein, $0 \le W_{skin}(i,j) \le 1$, the larger the value is, the more likely the point is considered as a skin tone point; $H_0$, $H_1$, $S_0$, $S_1$, $D_s$ and $D_h$ are preset values satisfying, and $H_0 + 2\times D_h < H_1$, and $S_0 + 2\times D_s < S_1$; $D_s$ is used to adjust the width of the weight transition interval in the S direction, and $D_h$ is used to adjust the width of the weight transition interval in the H direction;

for non-skin tone points, the corresponding skin tone weight value is $W_{skin}(i,j)=0$.

6. The method according to claim 5, further comprising:

the steps of obtaining the facial skin tone weight value for each point based on the face region information of the input image is as follows:

step 1, perform face detection on the input image by the face detection unit to obtain the face region information of the input image, for the N faces detected in the input image, the k-th ($0 \le k < N$) face region information is $F(x_k, y_k, w_k, h_k)$, indicating that the coordinates of the upper left corner of the region is $(x_k, y_k)$, and the width of the region is $w_k$, and the height is $h_k$;

step 2, for each point (i,j), from the 0-th face to the (N-1)-th face, determine whether the point falls in the above face region; if the point falls in the region, the face weight value is $W_{face}(i,j)=1$; Otherwise, $W_{face}(i,j)=0$;

step 3, the facial skin tone weight $W(i,j)$ is calculated according to the skin tone weight $W_{skin}(i,j)$ and the face weight $W_{face}(i,j)$ of each point(i,j), as the following formula:

$$W(i,j) = \begin{cases} W_{skin}(i,j), & W_{face}(i,j) = 1 \\ 0, & W_{face}(i,j) = 0 \end{cases}.$$

7. The method according to claim 6, further comprising:

blend the first edge value $E_{2a}$ with the second edge value $E_{2b}$ by the aforementioned facial skin tone weight $W(i,j)$ to obtain the final edge value $E(i,j)$ for each point, as the following formula:

$$E(i,j) = E_{2a}(i,j) \times (1 - W(i,j)) + E_{2b}(i,j) \times W(i,j),$$

and the enhanced edge value $Y_{out}(i,j)$ is obtained by summed the input luminance value $Y_{in}(i,j)$ with the edge value $E(i,j)$, as the following formula:

$$Y_{out}(i,j)=Y_{in}(i,j)+E(i,j) \quad 5$$

the processed image is obtained as the output luminance image.

8. The method according to claim 6, wherein the step 2 comprising:
step 21, initialization, let k=0;
step 22, obtain the face region information $F(x_k, y_k, w_k, h_k)$ of the k-th face;
step 23, for the point (i,j), determine whether $x_0 \leq j \leq x_0+w_k$ and $y_0 \leq i \leq y_0+h_k$ are true, if they are true, the point falls in the k-th face region, skip to step 27; otherwise, go to step 24;
Step 24, let k=k+1;
Step 25, determine whether k<N is true, if it is true, skip to step 22; otherwise, go to step 26;
Step 26, let $W_{face}(i,j)=0$, end the judgement of the current point;
Step 27, let $W_{face}(i,j)=1$, end the judgement of the current point.

9. An image edge enhancement processing apparatus, the apparatus comprising:
processor;
memory for storing processor executable instructions and parameters;
the processor includes an edge analysis unit, a skin color analysis unit and an enhancement processing unit;
wherein the edge analysis unit is configured to receive an input image separated into a luminance signal and a chrominance signal, the luminance signal corresponds to the input luminance image and the chrominance signal corresponds to the input luminance image; and to obtain a first edge value by processing the input luminance image with a first set of parameters applicable to non-facial skin tone points, and to obtain a second edge value by processing the input luminance image with a second set of parameters applicable to facial skin tone points values;

and the skin tone analysis unit is configured to obtain the skin tone weight value of each point by performing skin tone detection on the input chroma image, and obtain the facial skin tone weight value of each point based on the face region information of the input image; wherein the facial skin tone weight value of the skin tone point within the face region is equal to the skin tone weight value of that point, while the skin tone weight value for the skin tone point outside the face region is cleared to zero;

and the enhancement processing unit is configured to blend the first edge value with the second edge value by the aforementioned facial skin tone weight value, and combining the blended edge value with the input luminance value for edge enhancement.

10. An image edge enhancement processing system, the system comprising an edge detection unit and an edge enhancement unit, wherein the system further comprises a face region modulation unit between the edge detection unit and the edge enhancement unit, and the face region modulation unit is connected to a skin tone detection unit;

wherein the skin tone detection unit is configured to: perform the skin tone detection on the input chrominance image to obtain the skin tone weight value of each point, and obtain the facial skin tone weight value of each point according to the face region information of the input image; wherein the facial skin tone weight value of the skin tone point in the face region is equal to the skin tone weight value of that point, while the skin tone weight value for the skin tone point outside the face region is cleared to zero;

and the face region modulation unit is configured to: obtain a first edge value by processing the input luminance image with a first set of parameters applicable to non-facial skin tone points and a second edge value by processing the input luminance image with a second set of parameters applicable to facial skin tone points; and blend the first edge value with the second edge value by the aforementioned facial skin tone weight value and transfer the blended edge value to the edge enhancement unit for edge enhancement.

* * * * *